(12) United States Patent
Iijima

(10) Patent No.: US 6,977,699 B2
(45) Date of Patent: Dec. 20, 2005

(54) LIQUID-CRYSTAL DISPLAY DEVICE AND ELECTRONIC EQUIPMENT

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/095,694

(22) Filed: Mar. 13, 2002

(65) Prior Publication Data

US 2002/0180911 A1 Dec. 5, 2002

(30) Foreign Application Priority Data

Mar. 28, 2001 (JP) ........................................ 2001-094080

(51) Int. Cl.⁷ ............................................. G02F 1/1335
(52) U.S. Cl. ........................................ 349/114; 349/96
(58) Field of Search ............................ 349/96, 116, 97, 349/112, 113, 117, 106, 114

(56) References Cited

U.S. PATENT DOCUMENTS

| | | | | |
|---|---|---|---|---|
| 4,040,727 A | * | 8/1977 | Ketchpel | 349/114 |
| 4,241,984 A | | 12/1980 | Leibowitz | |
| 5,686,979 A | * | 11/1997 | Weber et al. | 349/96 |
| 6,049,428 A | | 4/2000 | Khan et al. | |
| 6,124,907 A | * | 9/2000 | Jones et al. | 349/96 |
| 6,292,439 B1 | * | 9/2001 | Akiba et al. | 368/84 |
| 6,417,899 B1 | * | 7/2002 | Jones et al. | 349/96 |
| 6,633,353 B1 | * | 10/2003 | Seki et al. | 349/113 |
| 2001/0022997 A1 | * | 9/2001 | Honda et al. | |

FOREIGN PATENT DOCUMENTS

| | | |
|---|---|---|
| EP | 0 952 478 A1 | 10/1999 |
| GB | 1 587 375 | 4/1981 |
| JP | 53-100265 | 9/1978 |
| JP | 1-295222 A | 11/1989 |
| JP | 3-21904 A | 1/1991 |
| JP | 3-105318 A | 5/1991 |
| JP | 7-28055 A | 1/1995 |
| JP | 8-286180 A | 11/1996 |
| JP | 10-206837 A | 8/1998 |
| JP | 2000-131681 A | 5/2000 |
| JP | 2000-147475 A | 5/2000 |
| JP | 2000-221481 A | 8/2000 |
| JP | 2000-298267 A | 10/2000 |
| JP | 2000-321564 | 11/2000 |
| JP | 2001-4994 A | 1/2001 |
| JP | 2001-33768 A | 2/2001 |
| JP | 2001-56463 A | 2/2001 |
| JP | 2002-48905 A | 2/2002 |
| WO | WO 00/57241 | 9/2000 |

* cited by examiner

Primary Examiner—Tarifur R. Chowdhury
Assistant Examiner—Thoi V. Duong
(74) Attorney, Agent, or Firm—Oliff & Berridge, PLC

(57) ABSTRACT

The invention provides a liquid-crystal display device of transflective type having a reflection mode and a transmission mode, with excellent visibility, in which the brightness of a display in the transmission mode is enhanced, and an electronic apparatus that includes this liquid-crystal display device. A liquid-crystal display device of transflective type includes liquid crystals held between an upper substrate and a lower substrate that are opposed to each other. A polarizer and a polarization layer are respectively disposed over and under the liquid crystals. An illumination device is arranged on the outer surface side of the lower substrate. A display is presented through the changeover between a transmission mode and a reflection mode. The liquid-crystal display device includes a transflective film and the polarization layer formed on the transflective film which are disposed on the inner surface side of the lower substrate. The invention also includes an electronic apparatus including the liquid-crystal display device.

8 Claims, 9 Drawing Sheets

(a) BRIGHT DISPLAY    (b) DARK DISPLAY (a) BRIGHT DISPLAY    (b) DARK DISPLAY

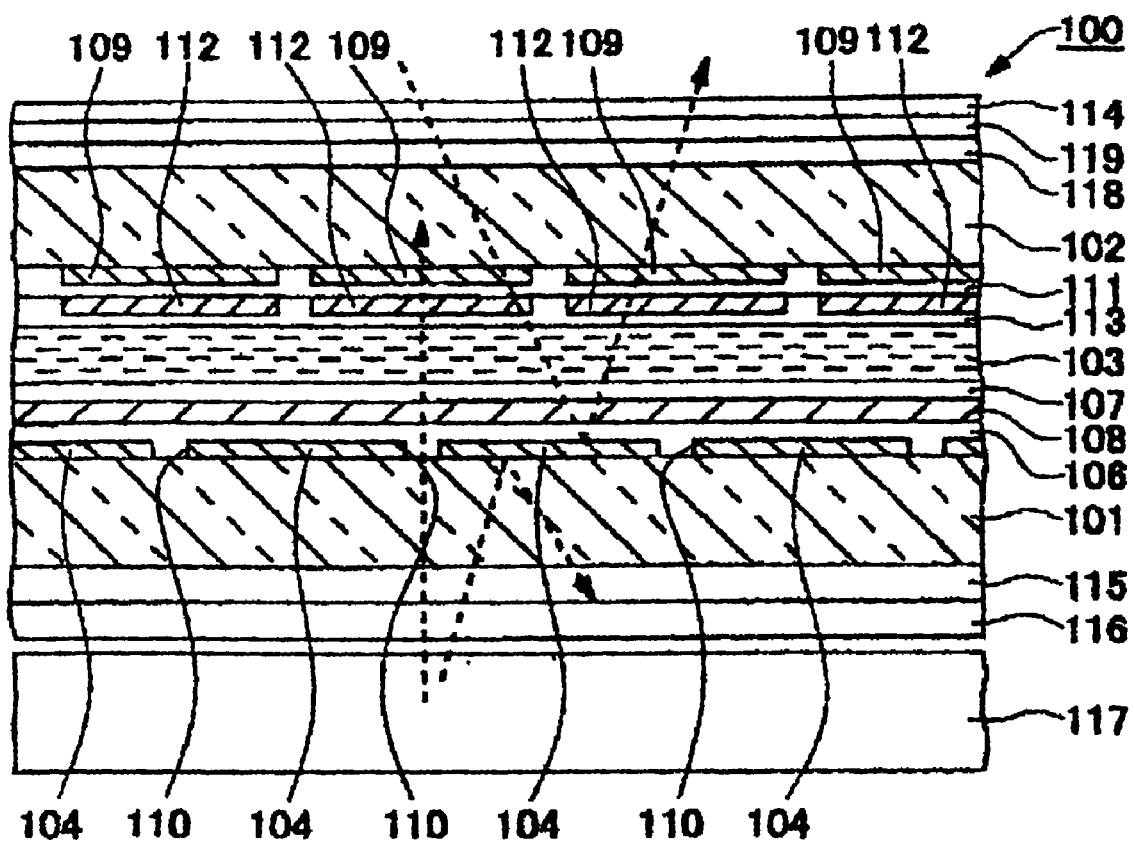

LIQUID-CRYSTAL DISPLAY DEVICE AND ELECTRONIC EQUIPMENT

BACKGROUND OF THE INVENTION

1. Field of Invention

The present invention relates to a liquid-crystal display device and an electronic apparatus, and more particularly to the construction of a transflective type liquid-crystal display device capable of presenting a display of sufficient brightness even in a transmission mode.

2. Description of Related Art

Since a reflection type liquid-crystal display device does not have a light source, such as a back light, its power consumption is low, and it has heretofore often been employed for accessory display units of various mobile electronic apparatuses and devices, for example.

Since, however, reflection type liquid-crystal display devices present a display by utilizing external light, such as natural light or illumination light, there has been a problem that the display is difficult to be visually perceived in a dark place. Therefore, there has been proposed a liquid-crystal display device in which the external light is utilized in a bright place in the same manner as in the ordinary reflection type liquid-crystal display device, while a display is made to be visible in a dark place by an internal light source. More specifically, this proposed liquid-crystal display device adopts display systems of both a reflection type and a transmission type, and it is changed over into the display system of either a reflection mode or a transmission mode in accordance with the ambient brightness. Thereby, power consumption is lowered, while a clear display can be presented even in dark surroundings. Hereinbelow, the liquid-crystal display device of this sort shall be termed "transflective type liquid-crystal display device" in this specification.

Another proposed transflective type liquid-crystal display device includes a reflection film, which is a metal film of aluminum or the like formed with slits for transmitting light, that is provided on the inner surface of a lower substrate. In accordance with this device, providing the metal film on the inner surface of the lower substrate prevents the influence of a parallax that is ascribable to the thickness of the lower substrate, and color mixture is prevented especially in a structure employing color filters. FIG. 12 shows an example of the transflective type liquid-crystal display device of a passive matrix system. In this liquid-crystal display device 100, liquid crystals 103 are sandwiched in between a pair of transparent substrates 101 and 102. A reflection film 104 and an insulating film 106 are stacked on the lower substrate 101 and are provided thereon, with each stripe-shaped scanning electrode 108 being made of a transparent conductive film of indium tin oxide (hereinbelow, abbreviated to "ITO") or the like, and an orientation film 107 is formed so as to cover such scanning electrodes 108. On the other hand, color filters 109 are formed on the upper substrate 102, with a flattening film 111 stacked thereon. Signal electrodes 112, made of transparent conductive films of ITO or the like, are formed on the flattening film 111 in the shape of stripes extending in a direction orthogonal to the scanning electrodes 108. An orientation film 113 is formed so as to cover the signal electrodes 112. The reflection film 104 is formed of a metal film of aluminum or the like, and it is formed with slits 110 for transmitting light for respective pixels. With the slits 110, the reflection film 104 functions as a transflective film. A forward scattering plate 118, a retardation film 119 and an upper polarizer 114 are arranged outside the upper substrate 102 in this order from the side of the upper substrate 102, whereas a quarter-wave plate 115 and a lower polarizer 116 are disposed outside the lower substrate 101. In addition, a back light 117 is arranged on the lower surface side of the lower substrate 101.

In a case where the liquid-crystal display device 100 of the above construction is used in its reflection mode in a bright place, external light incoming from above the upper substrate 102 is transmitted through the liquid crystals 103 and is reflected at the surface of the reflection film 104, and it is thereafter transmitted through the liquid crystals 103 again so as to exit towards the side of the upper substrate 102. In a case where the display device 100 is used in its transmission mode in a dark place, light emitted from the back light 117 that is arranged under the lower substrate 101 is transmitted through the reflection film 104 at the part of the slits 110, and it is thereafter transmitted through the liquid crystals 103 so as to exit towards the side of the upper substrate 102. The lights contribute to displays in the corresponding modes.

SUMMARY OF THE INVENTION

According to the liquid-crystal display device 100, the visual perception of the display is possible irrespective of whether or not the external light exists. However, this structure is subject to the problem that brightness in the transmission mode is insufficient as compared with that in the reflection mode. This problem is ascribable to the fact that the display in the transmission mode utilizes the light that has passed through the slits 110 provided in the reflection film 104, and the fact that the quarter-wave plate 115 and the lower polarizer 116 are disposed on the outer surface side of the lower substrate 101.

First, the liquid-crystal display device 100 presents the display by utilizing the light transmitted through the slits 110, in the transmission mode, so that the area (namely, aperture ratio) of the slits 110 relative to the reflection film 104 governs the brightness of the display. When the aperture ratio is enlarged, the display in the transmission mode can be brightened. On that occasion, however, the area of the reflection film 104 decreases, and hence, the display in the reflection mode darkens. In order to ensure the brightness in the reflection mode, accordingly, the aperture ratio of the slits 110 cannot be enlarged beyond a certain degree.

A description is provided below as to why the quarter-wave plate 115 is required on the outer surface side of the lower substrate 101, which causes insufficient brightness in the transmission mode. A structure which presents a dark display in a state where any voltage is not applied, and a bright display in a state where a voltage is applied, is discussed below.

First, in a case where the dark display in the reflection mode is presented in the liquid-crystal display device 100 shown in FIG. 12, light incoming from outside of the upper substrate 102 is turned into linearly polarized light that is parallel to the sheet of the drawing by passing through the upper polarizer 114 that is disposed over the upper substrate 102, with the transmission axis of the upper polarizer 114 assumed to be parallel to the sheet of the drawing, and the linearly polarized light is turned into substantially circularly polarized light by the birefringent effect of the liquid crystals 103 while passing through the liquid crystals 103. Subsequently, when the circularly polarized light is reflected by the surface of the reflection film 104 that is disposed on the inner surface side of the lower substrate 101, it is turned into circularly polarized light of reverse rotation, and when this circularly polarized light passes through the liquid crystals 130 again, it is turned into linearly polarized light that is perpendicular to the sheet of the drawing, and the linearly polarized light reaches the upper substrate 102. Here, since the upper polarizer 114 over the upper substrate 102 is the polarizer having the transmission axis parallel to the sheet of the drawing, the light that is reflected by the reflection film 104 is absorbed by the upper polarizer 114 and is not returned to the exterior of the liquid-crystal display device 100, so that the liquid-crystal display device 100 is brought into the dark display.

To the contrary, in the case of presenting the bright display in the reflection mode, orientation of the liquid crystals 103 changes when the voltage is applied to the liquid crystals 103. Therefore, when the light incoming from outside of the upper substrate 102 passes through the liquid crystals 103, it is turned into linearly polarized light. The linearly polarized light is reflected by the reflection film 104 without any change, and it is transmitted through the upper polarizer 114 over the upper substrate 102, remaining as the linearly polarized light that is parallel to the sheet of the drawing, and is returned to the exterior, so that the liquid-crystal display device 100 is brought into the bright display.

On the other hand, in a case where a display in the transmission mode is presented in the liquid-crystal display device 100, light emitted from the back light 117 enters the liquid-crystal display unit from outside of the lower substrate 101, and that light of the emitted light which has passed through the slits 110 becomes light which contributes to the display. Here, in order to present the dark display in the liquid-crystal display device 100, light which proceeds from the slits 110 toward the upper substrate 102 needs to be substantially circularly polarized light as in the case of the reflection mode. Accordingly, the light emitted from the back light 117 and having passed through the slits 110 also needs to become substantially circularly polarized light. Therefore, the quarter-wave plate 115 for converting linearly polarized light that has passed through the lower polarizer 116, into the substantially circularly polarized light, is required.

Here, light that has not passed through the slits 110 will be noticed in the light emitted from the back light 117. The light is emitted from the back light 117, and it is turned into linearly polarized light that is parallel to the sheet of the drawing by passing through the lower polarizer 116. Thereafter, the linearly polarized light is turned into substantially circularly polarized light by passing through the quarter-wave plate 115, and the circularly polarized light reaches the reflection film 104. Further, when the circularly polarized light is reflected by the reflection film 104 at the surface thereof on the side of the lower substrate 101, it is turned into circularly polarized light of reverse rotation, and when this circularly polarized light passes through the quarter-wave plate 115 again, it is turned into linearly polarized light that is perpendicular to the sheet of the drawing. Subsequently, the linearly polarized light is absorbed by the lower polarizer 116 which has a transmission axis that is parallel to the sheet of the drawing. That is, the light that has not passed through the slits 110, in the light emitted from the back light 117, is substantially entirely absorbed by the lower polarizer 116 that is below the lower substrate 101.

Further, notice will be taken of a case where the bright display in the transmission mode is presented by the liquid-crystal display device shown in FIG. 12. Although light passing through the slits 110 and entering the liquid crystals 103 passes through the upper polarizer 114 that is above the upper substrate 102 and exits above the liquid-crystal display device without undergoing the action of the liquid crystals 103, light proceeding from the slits 110 toward the upper substrate 102 is turned into substantially circularly polarized light by the quarter-wave plate 115. Accordingly, the quantity of light that passes through the upper polarizer 114 that has the transmission axis parallel to the sheet of the drawing becomes smaller than half of the quantity of the light having passed through the slits 110.

In this manner, in the liquid-crystal display device 100, the light reflected by the reflection film 104 without passing through the slits 110 in the transmission mode is substantially entirely absorbed by the lower polarizer 116 that is below the lower substrate 101. Therefore, only part of the light that is emitted from the back light 117 can be utilized for the display. Moreover, the light which exits above the liquid-crystal display device 100 after passing through the upper polarizer 114 that is above the upper substrate 102 is only smaller in the quantity than the half of the quantity of the light having passed through the slits 110.

The present invention has been made in order to address and/or solve the above problems, one aspect of the invention provides a liquid-crystal display device of transflective type having a reflection mode and a transmission mode, with excellent visibility as a result of enhancing the brightness of a display in the transmission mode.

The present invention in accordance with a second aspect provides an electronic apparatus that includes the above liquid-crystal display device of the transflective type having the excellent visibility.

As indicated in the problems, the insufficiency of the brightness in the transmission mode in the transflective type liquid-crystal display device is ascribable to the following two factors. One factor is that, in the transmission mode, light entering the upper polarizer 114 in the case of the bright display is substantially circularly polarized light, so light in an approximately half quantity is absorbed by the upper polarizer 114. More specifically, in the reflection mode, light that is reflected by the reflection film 104 is substantially circularly polarized light in the dark display and is substantially linearly polarized light in the bright display. For establishing the dark display in the transmission mode, therefore, light which passes through the slits 110 of the reflection film 114 needs to be substantially circularly polarized light. Consequently, also in the bright display, light which passes through the slits 110 of the reflection film 114 is substantially circularly polarized light, so that the light entering the upper polarizer 114 becomes the substantially circularly polarized light. Accordingly, the light in the approximately half quantity is absorbed by the upper polarizer 114, and the light that has passed through the slits 110 cannot be efficiently utilized.

The other factor is that light that is reflected by the lower surface of the reflection film 104 cannot be effectively utilized for the brightness. More specifically, the quarter-wave plate 115 is required for the foregoing reason. Due to the existence of the quarter-wave plate 115, the light that is reflected by the lower surface of the reflection film 104 is absorbed by the lower polarizer 116 below the lower substrate 101, so that the light of the back light 117 cannot be effectively utilized for the display.

With note taken of the quarter-wave plate 115 and the lower polarizer 116 which have caused a decrease of the brightness of the display in the transmission mode in this manner, the inventor studied the structure of a transflective type liquid-crystal display device which is capable of display without employing the quarter-wave plate 115 and the lower polarizer 116, so as to realize the present invention.

In order to address or solve the problems, the present invention provides a liquid-crystal display device of transflective type that includes liquid crystals sandwiched in between an upper substrate and a lower substrate that are opposed to each other, an upper polarization layer and a lower polarization layer that are respectively disposed over and under the liquid crystals, an illumination device that is disposed on the outer surface side of the lower substrate, and a display is presented through the changeover between a transmission mode and a reflection mode. The liquid-crystal display device of transflective type further includes a transflective film and the lower polarization layer formed on the transflective film which are disposed on the inner surface side of the lower substrate.

According to the liquid-crystal display device of the present invention, by employing the construction in which the transflective film is formed on the inner surface side of the lower substrate, and in which the polarization layer is formed on the transflective film, the quarter-wave plate and the polarizer outside of the lower substrate as heretofore required to present the display in the transmission mode can be omitted. Accordingly, the lowering of the quantity of light attributed to these parts can be reduced, minimized or prevented, so that a display of high brightness is possible in the transmission mode.

The reasons why, with the construction of the present invention, the displays in both the transmission mode and the reflection mode are possible without employing the quarter-wave plate and the polarizer outside the lower substrate, and besides, the brightness in the transmission mode can be enhanced, will be described in detail with reference to FIGS. 6(a), 6(b), 7(a) and 7(b) below.

First, the case of operating the liquid-crystal display device of the present invention in the transmission mode will be described with reference to FIGS. 6(a) and 6(b). FIGS. 6(a) and 6(b) show the partial sectional structure of the liquid-crystal display device according to the present invention in schematic fashion, wherein FIG. 6(a) shows the state of a bright display in the transmission mode, while FIG. 6(b) shows the state of a dark display in the transmission mode. That is, FIG. 6(a) shows the state in which no voltage is applied, while FIG. 6(b) shows the state in which a voltage is applied. Orientation films and electrodes are omitted from both FIGS. 6(a) and 6(b) in order to facilitate viewing the drawings.

The liquid-crystal display device shown in FIGS. 6(a) and 6(b) is constructed by arranging a back light 128 on the lower surface side of a liquid-crystal panel 120 (the outer surface side of a lower substrate 121) which is constructed by sandwiching liquid crystals 123 in between the lower substrate 121 and an upper substrate 122 arranged opposed to each other, and by arranging a transflective film 124 and a polarization layer 125 successively stacked and formed on the inner surface side of the lower substrate 121 of the liquid-crystal panel 120. An upper polarizer 126 is disposed on the outer surface side of the upper substrate 122. Further, a plurality of slits (openings) 127 for the transmission displays are provided in the transflective film 124. Also, a reflector 129 is disposed on the lower surface side of the back light 128 (the side opposite to the liquid-crystal panel 120).

In the bright display state shown in FIG. 6(a), light that has passed through the slit 127 of the transflective film 124, and light emitted from the back light 128 toward the liquid-crystal panel 120, is converted into linearly polarized light perpendicular to the sheet of the drawing by the polarization layer 125 whose transmission axis is assumed to be perpendicular to the sheet of the drawing, and the linearly polarized light enters the liquid crystals 123. Subsequently, the linearly polarized light is rotated by the liquid crystals 123 into linearly polarized light parallel to the sheet of the drawing, and the resulting linearly polarized light enters the upper polarizer 126 and then exits out of the upper polarizer 126. That is, the loss of light attributed to the upper polarizer 126 is hardly involved.

Next, light which has been reflected by the back surface side of the transflective film 124 (the side opposite to the lower substrate 121) without entering the slit 127 will be noticed in the light emitted from the back light 128. The light reflected by the back surface side of the transflective film 124 passes through the lower substrate 121 as well as the back light 128 and enters the reflector 129. Subsequently, it is reflected by the reflector 129 into light which proceeds to the liquid-crystal panel 120 again. Accordingly, the light, which has not entered the slit 127, enters any other slit 127 in the course of which it repeats the reflections by the back surface side of the transflective film 124 and the reflector 129, and it can be utilized for the display as with the foregoing light that has entered the slit 127. That is, the light having fallen on the reflection film 129 can also be effectively utilized.

On the other hand, in the dark display state shown in FIG. 6(b), light emitted from the back light 128 passes through the slit 127 of the transflective film 124 and is converted into linearly polarized light that is perpendicular to the sheet of the drawing by the polarization layer 125, and the linearly polarized light enters the liquid crystals 123. In the dark display state, the liquid crystals 123 are applied the voltage and are oriented substantially in a direction perpendicular to the upper and lower substrates 122, 121, so that the light having entered the liquid crystals 123 reaches the upper polarizer 126, undergoing almost no action of the liquid crystals 123. Subsequently, since the upper polarizer 126 has a transmission axis that is parallel to the sheet of the drawing, the light that has entered the upper polarizer 126 is absorbed by the upper polarizer 126, and it does not exit out of the liquid-crystal panel 120.

In this manner, in the liquid-crystal display device of the present invention, the polarization layer 125 is disposed on the transflective film 124, whereby the loss of light attributed to the upper polarizer 126 is hardly involved, and moreover, the light returning to the back light 128 after having been reflected by the back surface side of the transflective film 124 can be utilized for the display of the transmission mode again. Accordingly, the quantity of light which enters the liquid crystals 123 by passing through the slits 127 can be sharply increased, so that the brightness of the display in the transmission mode can be remarkably enhanced, while at the same time, the effect of heightening a contrast is attained by enhancement in the intensity of the bright display. Further, in the liquid-crystal display device of the present invention, the quarter-wave plate and the polarizer to be arranged on the outer side of the lower substrate 121 are obviated, so that the cost of manufacture can be reduced by decreasing in the number of component parts.

Next, the case of operating the liquid-crystal display device of the present invention in the reflection mode will be described with reference to FIGS. 7(a) and 7(b). FIGS. 7(a) and 7(b) show the partial sectional structure of the liquid-crystal display device according to the present invention in a schematic fashion, wherein FIG. 7(a) shows the state of a bright display in the reflection mode, while FIG. 7(b) shows the state of a dark display in the reflection mode. That is, FIG. 7(a) shows the state in which no voltage is applied, while FIG. 7(b) shows the state in which a voltage is applied. Orientation films and electrodes are omitted from both FIGS. 7(a) and 7(b) in order to facilitate viewing the drawings.

Since the liquid-crystal display device shown in FIGS. 7(a) and 7(b) is the same as that shown in FIGS. 6(a) and 6(b), the same constituents as those shown in FIGS. 6(a) and 6(b) will be designated with the same reference numerals, and they shall be omitted from explanation. The back light and the reflector which are not operated in the ensuing reflection mode are omitted from FIGS. 7(a) and 7(b) in order to facilitate viewing the drawing.

Light that has entered the liquid-crystal display device shown in FIG. 7(a), from above, is converted into light parallel to the sheet of the drawing by the upper polarizer 126 whose transmission axis is assumed to be parallel to the sheet of the drawing. Subsequently, the light is rotated by the liquid crystals 123 to be converted into linearly polarized light that is perpendicular to the sheet of the drawing. Further, the linearly polarized light passes through the polarization layer 125 disposed on the transflective film 124, as it is, and then it is reflected by the transflective film 124 to return into the liquid crystals 123 again. Subsequently, the reflected light is rotated by the liquid crystals 123 to be converted into linearly polarized light that is parallel to the sheet of the drawing and into substantially circularly polarized light, which reaches the lower surface side of the upper polarizer 126 (the side opposite to the upper substrate 122). Further, the substantially circularly polarized light is transmitted through the upper polarizer 126 to return above the liquid-crystal display device. In this way, the liquid-crystal display device shown in FIG. 7(a) is held in the bright display state in the reflection mode.

On the other hand, in the case of the dark display state shown in FIG. 7(b), light having entered the liquid-crystal display device from above is converted into linearly polarized light that is parallel to the sheet of the drawing by the upper polarizer 126, and the linearly polarized light enters the liquid crystals 123. Since the voltage is applied to the liquid crystals 123 in the state shown in FIG. 7(b), the liquid crystals 123 are held oriented to be substantially perpendicular to the upper and lower substrates 122 and 121, and they exert almost no action on the incident light. Accordingly, the incident light reaches the polarization layer 125 as the linearly polarized light that is parallel to the sheet of the drawing. Since the polarization layer 125 has a transmission axis that is perpendicular to the sheet of the drawing, the incident light which is the linearly polarized light that is parallel to the sheet of the drawing is absorbed by the polarization layer 125. In this way, the liquid-crystal display device shown in FIG. 7(b) is held in the dark display state in the reflection mode.

In this manner, the liquid-crystal display device of the transflective type according to the present invention is also capable of display in the reflection mode.

As described above in detail, the liquid-crystal display device 120 of the present invention having the foregoing construction has the polarization layer 125 disposed on the transflective film 124, whereby the display in the transmission mode is possible without disposing the quarter-wave plate, and besides, the display in the transmission mode can be made to be remarkably bright by utilizing the light reflected by the back surface of the transflective film 124, for the display.

Next, in the liquid-crystal display device of the present invention, an upper polarization layer formed on the upper substrate side can also be disposed on the inner surface side of the upper substrate.

With such a construction, it is unnecessary to dispose the polarizer on the outer side of the upper substrate, so that the cost of manufacture can be reduced by decreasing in the number of man-hours and the number of component parts. Moreover, the upper polarization layer that is disposed on the inner surface side of the upper substrate can serve also as a flattening film to flatten unevenness ascribable to color filters or electrodes, so that any flattening film need not be separately disposed on the inner surface side of the upper substrate.

Next, the liquid-crystal display device of the present invention can also be so constructed that a scattering layer that scatters light reflected by the transflective film is disposed over the transflective film or on the surface thereof.

With such a construction, the light reflected by the transflective film can be scattered, so that the visibility of the liquid-crystal display device can be prevented from lowering due to the reflection of the light in a specified direction. Also, a forward scattering plate that scatters light exiting from the liquid-crystal display device need not be disposed on the outer surface side of the upper substrate, so that manufacturing costs can be reduced by decreasing the number of component parts.

In the present invention, the scattering layer may be either on the upper side of the transflective film, or on the lower side of the transflective film, in order to endow the transflective film with a shape that is capable of diffusing light.

Next, the liquid-crystal display device of the present invention can also be so constructed that openings that transmit light are formed in the transflective film.

With such a construction, light emitted from the illumination device can be caused to directly enter the liquid crystals through the openings, so that a display of high brightness can be attained in case of presenting the display in the transmission mode. Moreover, the intensities of the reflection mode and transmission mode can be easily adjusted by adjusting the size (namely, aperture ratio) of the openings.

In the liquid-crystal display device according to the present invention, besides the transflective film provided with the openings as stated above, a transflective film which is made very thin so as to be capable of transmitting light can be applied.

Next, the liquid-crystal display device of the present invention can also be so constructed that a polarizer, which has a transmission axis that is substantially parallel to the transmission axis of the lower polarization layer, is disposed on the outer surface side of the lower substrate.

With such a construction, the degree of polarization can be made to be higher than in the case where incident light is converted into polarized light only by the polarization layer that is disposed on the inner surface side of the lower substrate. Accordingly, in the case where entered light is absorbed by the polarization layer or polarizer disposed over the upper substrate (that is, in the case where the liquid-crystal display device is in the dark display state), the light is efficiently absorbed by the upper polarization layer or the polarizer over the upper substrate, and the quantity of light which passes through the upper substrate can be decreased. Thus, the dark display can be made darker, so that the contrast of the liquid-crystal display device can be heightened.

Next, the liquid-crystal display device of the present invention can also be so constructed that a reflective polarizer, which has a transmission axis that is substantially parallel to the transmission axis of the polarizer, is disposed on the polarizer lying on the outer surface side of the lower substrate.

Here, the "reflective polarizer" signifies a polarizer which has a reflection axis and the transmission axis. With such a construction, the reflective polarizer allows light, which cannot pass through the polarizer of the lower substrate, to return onto the side of the illumination device, and introduces only light, which can pass through the polarizer, into the liquid-crystal panel. Besides, the light reflected and returned to the illumination device by the reflective polarizer has its polarization state changed, and becomes light that is capable of passing through the reflective polarizer, during its reflections between the illumination device and the reflective polarizer, so that the light also becomes utilizable for display. Accordingly, almost all of the light emitted from the illumination device can be utilized for the display, and a display having higher brightness can be attained in the transmission mode.

The above operation will be described in detail with reference to FIG. 8 below. FIG. 8 is a schematic diagram showing the partial sectional structure of a liquid-crystal display device according to the present invention. In a case where the bright display of the transmission mode is presented in the liquid-crystal display device shown in FIG. 8, light emitted from a back light 140 is turned into linearly polarized light that is perpendicular to the sheet of the drawing by a reflective polarizer 139 whose transmission axis is assumed to be perpendicular to the sheet of the drawing, and the linearly polarized light is transmitted through the polarizer 139, whereas any light component parallel to the sheet of the drawing is reflected to return onto the side of the back light 140. Further, the light transmitted through the reflective polarizer 139 is transmitted through a polarizer 138 which has a transmission axis that is substantially parallel to that of the reflective polarizer 139, and part of the transmitted light passes through a slit 137, whereas the other light is reflected by a reflection film 134. The reflected light returns onto the side of the back light 140 through the polarizer 138 as well as the reflective polarizer 139 again. The light having passed through the slit 137 is transmitted through a polarization layer 135 having a transmission axis that is parallel to that of the polarizer 138, and thereafter enters liquid crystals 133. The light that has entered the liquid crystals 133 is rotated and converted into linearly polarized light that is parallel to the sheet of the drawing by the liquid crystals 133, and the linearly polarized light enters a polarizer 136. Since the polarizer 136 has a transmission axis that is parallel to the sheet of the drawing, a component that is parallel to the sheet of the drawing in the light having entered the polarizer 136 is transmitted through the polarizer 136 and is caused to exit above a liquid-crystal panel 130.

Here, the light reflected by the reflective polarizer 139 will be noticed in the light emitted from the back light 140. After having been reflected by the reflective polarizer 139, the light returns onto the side of the back light 140. The light is then reflected by a reflector 141 on the back surface side of the back light 140 again, to enter the reflective polarizer 139 again, and it is reflected by the reflective polarizer 139 again. In this manner, the light reflected by the reflective polarizer 139 repeats the reflections between the reflective polarizer 139 and the reflector 141. In the course in which such reflections are repeated, the light has its polarization state changed and becomes light that contains a component which can be transmitted through the reflective polarizer 139 upon entering this plate 139, and the component which is transmitted through the reflective polarizer 139 is utilized for the display.

The light transmitted through the reflective polarizer 139 and thereafter reflected by the reflection film 134 will be noticed in the light emitted from the back light 140. After having been reflected by the reflection film 134, the light returns onto the side of the back light 140, and it is reflected by the reflector 141 on the back surface side of the back light 140 again, to enter the reflection film 134 again and to partially pass through the slit 137. In this manner, the light reflected by the reflection film 134 passes through the slit 137 in the course of which it repeats the reflections between the reflection film 134 and the reflector 141, and it is effectively utilized.

In this manner, according to the liquid-crystal display device of the present invention, not only the component that is parallel to the transmission axis of the reflective polarizer 139 or the polarizer 138, but also the light reflected by the reflective polarizer 139 or the reflection film 134 can be utilized for the display in the light emitted from the back light 140. Accordingly, almost all of the light emitted from the back light 140 can be utilized for the display, so that a display of higher brightness than in the prior art is possible even in the case of employing the back light 140 of the same quantity of light.

Next, the liquid-crystal display device of the present invention can also be so constructed such that color filters are disposed on the inner surface side of the upper substrate or lower substrate.

With such a construction, a color display is, of course, possible, and a parallax, especially in the reflection mode, can be alleviated because the color filters are arranged on the inner surface side of the upper or lower substrate.

Next, the liquid-crystal display device of the present invention can also be so constructed that the lower polarization layer is disposed on the color filters.

With such a construction, separately disposing a flattening film to flatten unevenness formed by the color filters can be obviated, so that manufacturing costs can be achieved by decreasing the number of man-hours.

A form of the liquid-crystal display device to which the present invention can be applied includes a liquid-crystal display device of a passive matrix system. However, the present invention is not restricted to the above form at all, and it is also applicable to other forms, such as a liquid-crystal display device of active matrix system which employs thin film diodes (TFDs), thin film transistors (TFTs) or the like as switching elements, for example.

An electronic apparatus according to the present invention includes the liquid-crystal display device of the present invention.

According to this construction, it is possible to realize the electronic apparatus that includes an excellent display unit capable of attaining a display of high brightness in the transmission mode.

BRIEF DESCRIPTION OF THE DRAWINGS

FIGS. 6(a) and 6(b) show the partial sectional structure of a liquid-crystal display device according to the present invention in a schematic manner, wherein FIG. 6(a) shows the state of a bright display, while FIG. 6(b) shows the state of a dark display;

FIGS. 7(a) and 7(b) show the partial sectional structure of the liquid-crystal display device according to the present invention in schematic manner, wherein FIG. 7(a) shows the state of a bright display, while FIG. 7(b) shows the state of a dark display;

FIG. 12 is a schematic showing an example of a liquid-crystal display device of prior art construction.

DETAILED DESCRIPTION OF PREFERRED EMBODIMENTS (First Embodiment: Liquid-Crystal Display Device)

The first embodiment of the present invention will be described with reference to the drawings.

Figure 1:
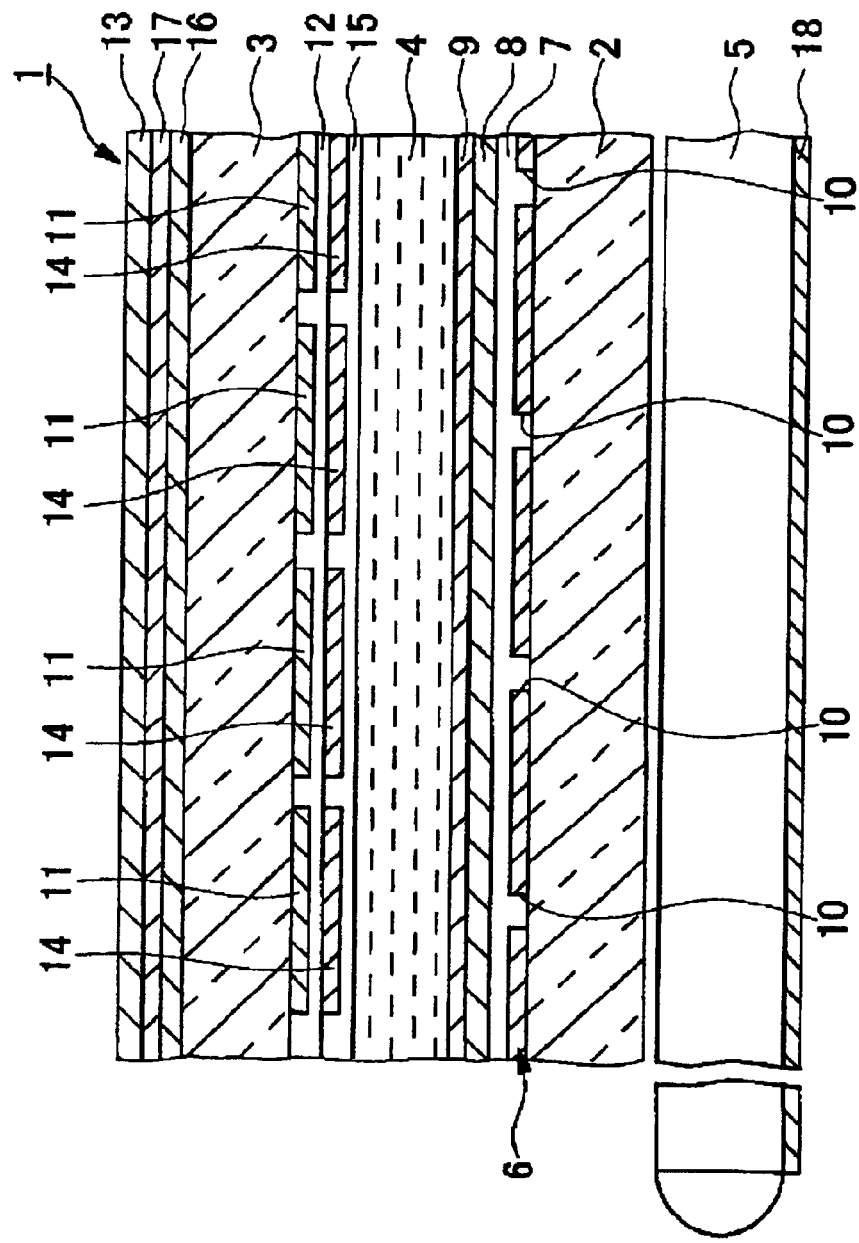
FIG. 1 is a schematic showing the partial sectional structure of a liquid-crystal display device of a passive matrix system according to the first embodiment of the present invention.

FIG. 1 is a schematic showing the partial sectional structure of a liquid-crystal display device in this embodiment. This embodiment exemplifies a transflective type color liquid-crystal display device of passive matrix system. In the drawings referred to below, the ratios of the thicknesses and sizes of constituents are not intended to actually represent relative thicknesses and sizes, and instead are only provided to facilitate viewing the elements of the figures.

As shown in FIG. 1, the liquid-crystal display device 1 of this embodiment includes a liquid-crystal panel 1 which is constructed such that a lower substrate 2 and an upper substrate 3 are arranged so as to be opposed to each other. Liquid crystals 4, which are STN (Super Twisted Nematic) crystals or the like, are held in a space sandwiched by the upper substrate 3 and lower substrate 2. A back light (illumination device) 5 is arranged on the back surface side of the liquid-crystal panel 1 (the outer surface side of the lower substrate 2).

A transflective film 6, made of a metal film of high reflectivity, such as aluminum, and a polarization layer 7 are successively stacked and formed on the inner surface side of the lower substrate 2, which is made of a glass, a resin or the like. Stripe-shaped scanning electrodes 8, each of which is made of a transparent conductive film of ITO or the like, are extended on the polarization layer 7 in the lateral direction as viewed in FIG. 1, and an orientation film 9, which is made of polyimide or the like, is stacked so as to cover the scanning electrodes 8. Slits (openings) 10 to transmit light emitted from the back light 5 are provided in the transflective film 6 for respective pixels.

On the other hand, color filters 11 of red, green and blue, which are repeatedly arrayed in this order, are provided on the inner surface side of the upper substrate 3 that is made of a glass, a resin or the like, extending in a direction that is perpendicular to the sheet of the drawing so as to be orthogonal to the scanning electrodes 8 of the lower substrate 2. A flattening film 12 to flatten unevenness formed by these color filters is stacked on the color filters 11. Further, stripe-shaped signal electrodes 14, each of which is made of a transparent conductive film of ITO or the like, are disposed on the flattening film 12 so as to extend in a direction perpendicular to the sheet of the drawing, and an orientation film 15, which is made of polyimide or the like, is stacked and formed on the signal electrodes 14. A forward scattering plate 16, a retardation film 17 and a polarizer 13 are disposed in this order on the outer surface side of the upper substrate 3. A reflector 18 is disposed on the lower surface side of the back light 5 (the side opposite to the liquid-crystal panel 1).

The polarization layer 7 can be formed, for example, in such a way that the transflective film 6 is coated with rheotropic liquid crystals that constitute a dye, while the lower substrate 2 is being stressed, such that the liquid crystals are thereafter hardened. In this case, the polarization axis of the polarization layer 7 can be set in any desired direction in accordance with the direction of the stress during the coating. "LC Polarizer" (tradename: produced by Optiva, Inc. in U.S.) or the like can be used as an appropriate material for forming the polarization layer 7, for example. The material "LC Polarizer" is disclosed in U.S. Pat. No. 6,049,428.

The liquid-crystal display device of this embodiment that has the above basic construction is constructed by stacking the polarization layer 7 on the transflective film 6, and a quarter-wave plate and a polarizer heretofore disposed on the outer surface side of the lower substrate 2 are omitted from this liquid-crystal display device. With such a construction, the liquid-crystal display device of this embodiment is capable of providing display of excellent visibility in both a reflection mode and a transmission mode. Especially in the transmission mode, light reflected by the back surface side of the transflective film 6, and light emitted from the back light 5, can be reflected by the reflector 18 so as to return onto the side of the liquid-crystal panel 1 again, because the polarizer and the quarter-wave plate are not disposed on the outer surface side of the lower substrate 2. Accordingly, the light of the back light 5 can be effectively utilized for the display, so that the brightness of the display can be made to be remarkably higher than in the prior art.

Moreover, according to the construction of the liquid-crystal display device of this embodiment, the quarter-wave plate and the polarizer on the lower substrate side can be omitted as stated above, so that manufacturing costs can be reduced by decreasing the number of component parts.

(Second Embodiment: Liquid-Crystal Display Device)

In the second embodiment, unless otherwise indicated the general construction of a liquid-crystal display device is the same as in the first embodiment shown in FIG. 1, and detailed description thereof is omitted. An aspect in which the liquid-crystal display device of this embodiment differs from that of the first embodiment, is that a polarizer 20 and a reflective polarizer 21 are successively stacked and disposed on the outer surface side of a lower substrate 2, and only this feature will be described with reference to FIG. 2.

Figure 2:
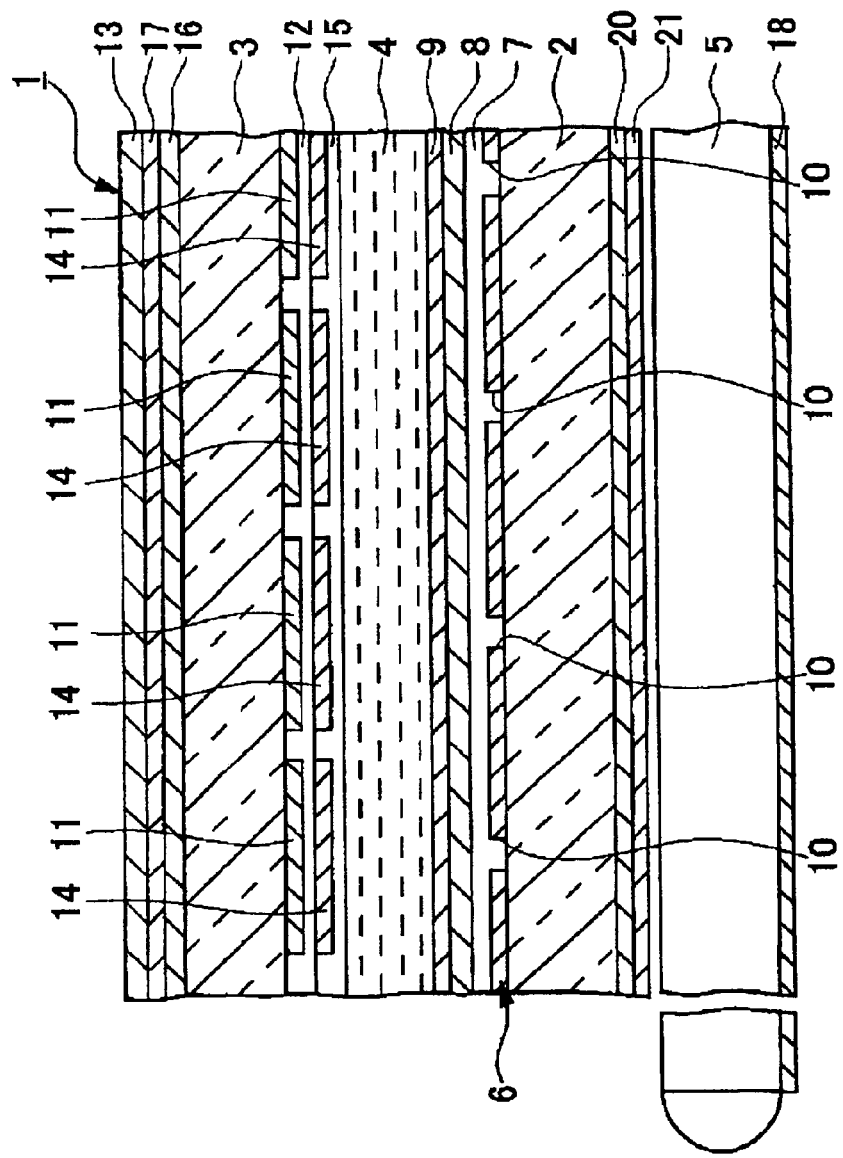
FIG. 2 is a schematic showing the partial sectional structure of a liquid-crystal display device of a passive matrix system according to the second embodiment of the present invention.

FIG. 2 is a schematic showing the partial sectional structure of the liquid-crystal display device of this embodiment. In FIG. 2, constituents common to FIG. 1 are assigned the same reference numerals.

Both the polarizer 20 and the reflective polarizer 21 on the outer surface side of the lower substrate 2, as shown in FIG. 2, have polarization axes which are parallel to the polarization axis of the polarization layer 7 on the inner surface side of the lower substrate 2. Since the polarizer 20 is disposed together with the polarization layer 7, the degree of polarization can be enhanced. Therefore, in case of presenting a dark display, for example, light which reaches the upper substrate 3 by passing through the liquid crystal 4 can almost only include linearly polarized light. Thus, the quantity of light which passes through the polarizer 13 over the upper substrate 3 without being absorbed thereby can be decreased, so that the dark display can be made to be darker to heighten the contrast of the liquid-crystal display device.

Next, since the reflective polarizer 21 is disposed, light emitted from the back light 5 can be previously turned into linearly polarized light which can pass through the polarizer 20. It is therefore possible to reduce, minimize or prevent the light of the back light 5 from being absorbed by the polarizer 20, and to suppress the loss of the light of the back light 5. Further, in the light emitted from the back light 5, light that is reflected by the reflective polarizer 21 without passing therethrough is confined between the reflective polarizer 21 and the reflector 18 of the back light 5, and it repeats reflections between them. In due course, the confined light has its polarization direction changed, and it passes through the reflective polarizer 21 and becomes utilizable for display. According to the construction of this embodiment, therefore, almost all of the light emitted from the back light 5 can be utilized for the display, and the display of higher brightness is possible in the transmission mode.

(Third Embodiment: Liquid-Crystal Display Device)

Figure 3:
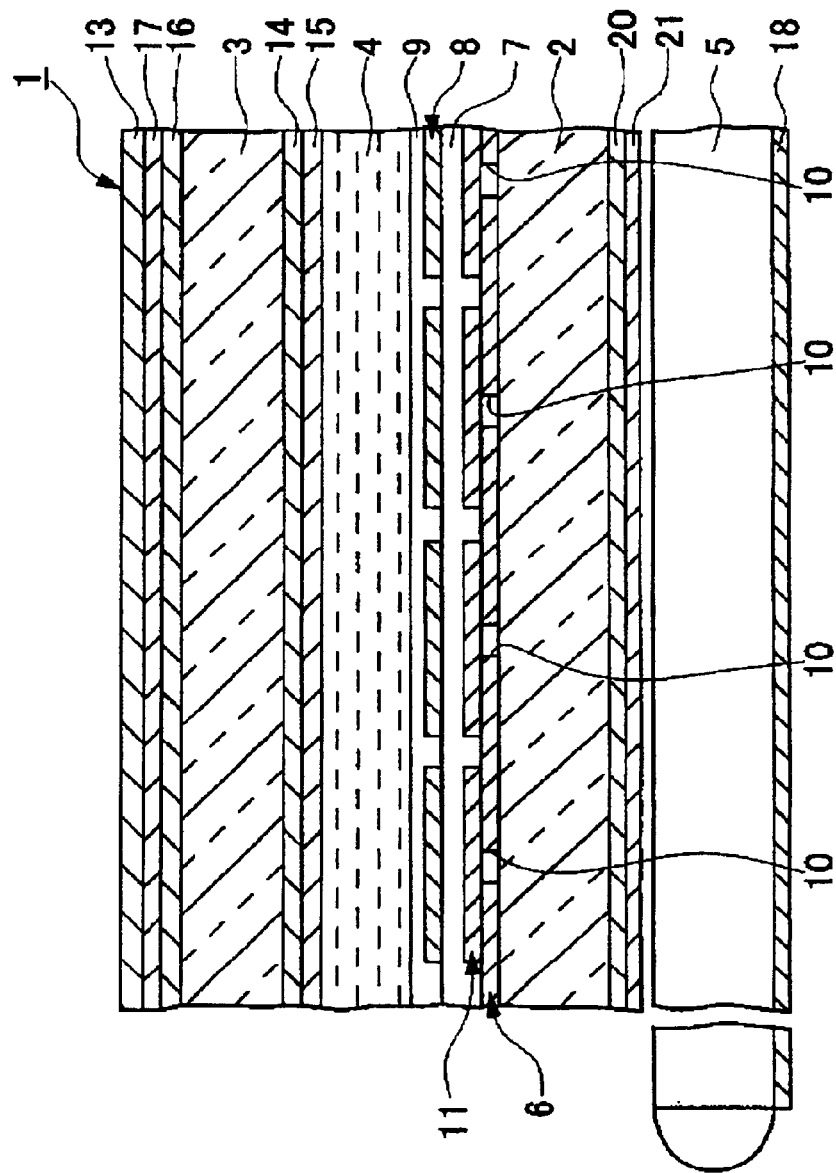
FIG. 3 is a schematic showing the partial sectional structure of a liquid-crystal display device of a passive matrix system according to the third embodiment of the present invention.

FIG. 3 is a schematic showing the partial sectional structure of a liquid-crystal display device which is the third embodiment of the present invention. Aspects in which the liquid-crystal display device of this embodiment shown in FIG. 3 differs from that of the second embodiment shown in FIG. 2 are that color filters 11 are stacked and formed on a transflective film 6 and are provided with a polarization layer 7 thereon, and that the stripe-shaped electrodes 8 of a lower substrate 2 extend in a direction perpendicular to the sheet of the drawing, while the stripe-shaped electrodes 14 of an upper substrate 3 extend horizontally as viewed in the figure. These parts will be described with reference to FIG. 3 below. In FIG. 3, constituents that are common to FIG. 2 are assigned the same reference numerals.

In the liquid-crystal display device of this embodiment shown in FIG. 3, the color filters 11 are disposed on the transflective film 6, so that a chromatic aberration and a parallax in the reflection mode can be alleviated. The reason therefor is that, since the color filters 11 are disposed directly on the transflective film 6, light transmitted through one pigment layer (of, for example, an R pixel) is thereafter reflected by the transflective film 6 and is transmitted through the same pigment layer again.

Moreover, the polarization layer 7 is disposed so as to cover the color filters 11, and hence, it also serves as a flattening film to flatten unevenness ascribable to the filters 11. According to the construction of this embodiment, therefore, a uniform cell gap can be formed without separately disposing any flattening film.

(Fourth Embodiment: Liquid-Crystal Display Device)

The fourth embodiment of the present invention will be described with reference to FIG. 4.

In this embodiment, unless other indicated the general construction of a liquid-crystal display device is the same as in the second embodiment shown in FIG. 2 and detailed description thereof shall therefore be omitted. Aspects in which the liquid-crystal display device of this embodiment differs from that of the second embodiment, are that a scattering layer 19 that endows a transflective film 6 with a shape capable of diffusing reflected light is interposed between the transflective film 6 and a lower substrate 2, and that a forward scattering plate 16 is omitted. Only these aspects will be described with reference to FIG. 4. FIG. 4 is a schematic showing the partial sectional structure of the liquid-crystal display device of this embodiment. In FIG. 4, constituents that are common to FIG. 2 are assigned the same reference numerals.

Figure 4:
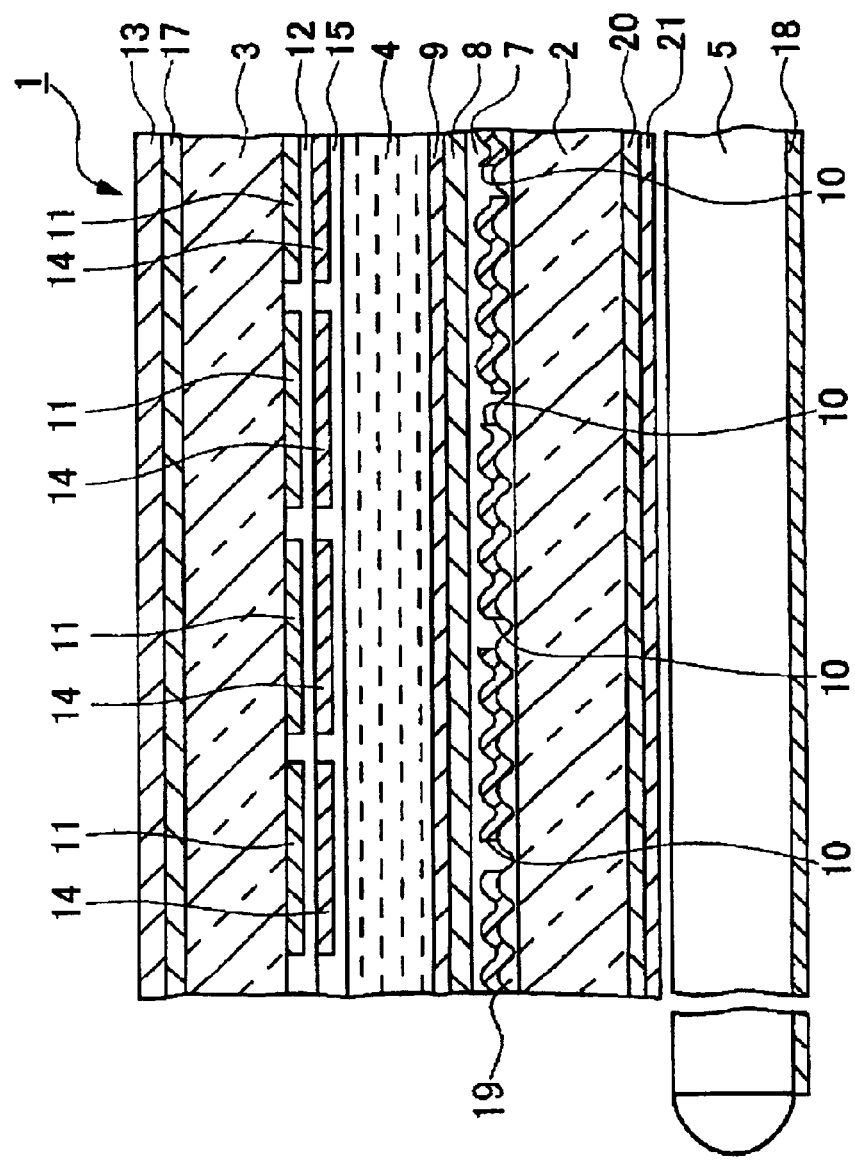
FIG. 4 is a schematic showing the partial sectional structure of a liquid-crystal display device of a passive matrix system according to the fourth embodiment of the present invention.

As shown in FIG. 4, in the liquid-crystal display device of this embodiment, the scattering layer 19 is interposed between the transflective film 6 and the lower substrate 2, so that light that has entered the liquid-crystal display device from the upper surface side thereof is reflected and also scattered by the transflective film 6. Therefore, a contrast can be prevented from lowering due to the reflection of the light in a specified direction by the transflective film 6. Thus, the forward scattering plate 16 can be omitted.

The scattering layer 19 is a resin film whose upper surface is formed in a rugged shape, and the rugged shape may be a well-known one. The reason why the transflective film 6 can scatter the light by disposing the scattering layer 19, is that when the transflective film 6 is formed on the scattering layer 19 having the rugged shape, the shape of the transflective film 6 also becomes one extending along the rugged shape.

In the liquid-crystal display device of this embodiment, the polarization layer 7 that is formed on the transflective film 6 also serves as a flattening film that flattens unevenness ascribable to the scattering layer 19 as well as the transflective film 6, so that any flattening film need not be separately formed. Further, according to the construction of this embodiment, the forward scattering plate which is otherwise disposed on the outer surface side of the upper substrate in order to scatter light reflected in a specified direction by the reflection film is dispensed with, and manufacturing costs can be reduced by decreasing the number of component parts.

(Fifth Embodiment: Liquid-Crystal Display Device)

Figure 5:
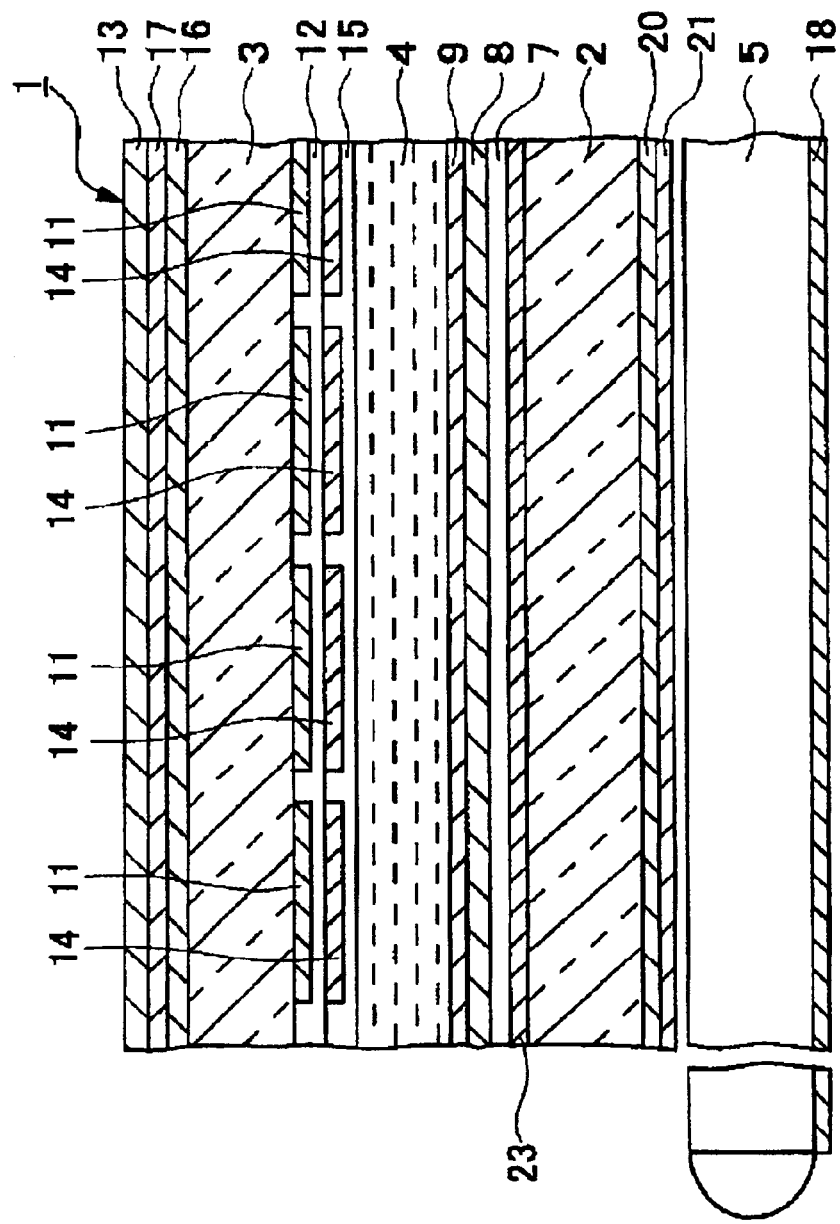
FIG. 5 is a schematic showing the partial sectional structure of a liquid-crystal display device of a passive matrix system according to the fifth embodiment of the present invention.
Figure 6:
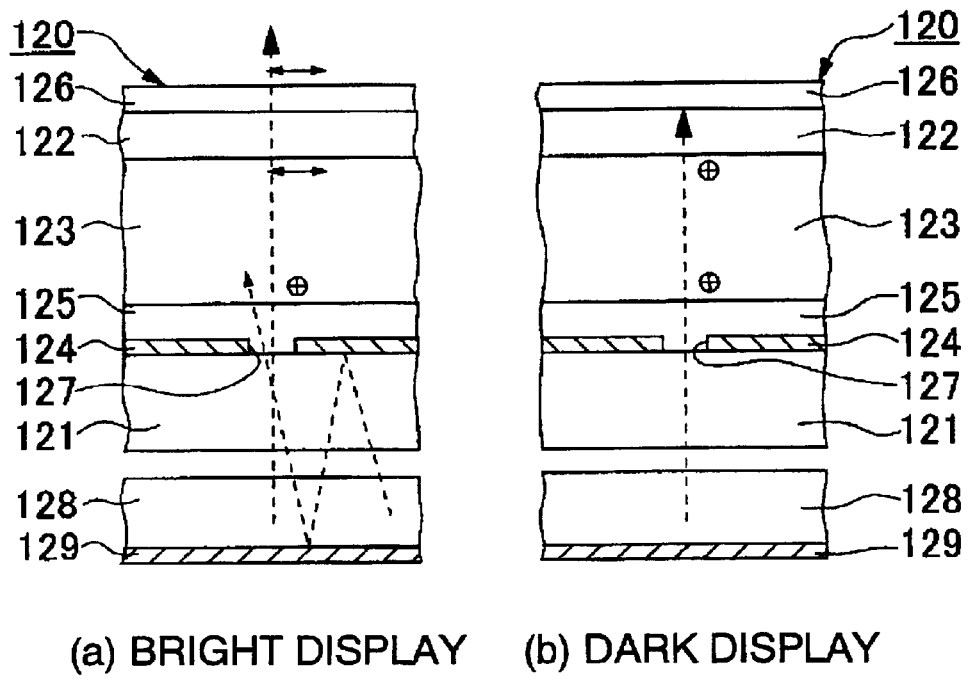
Figure 7:
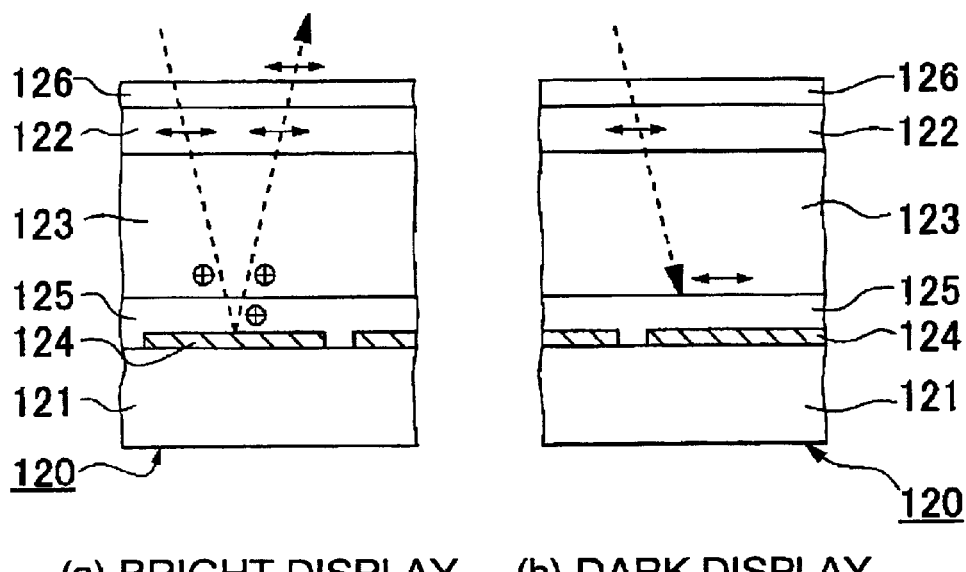
Figure 8:
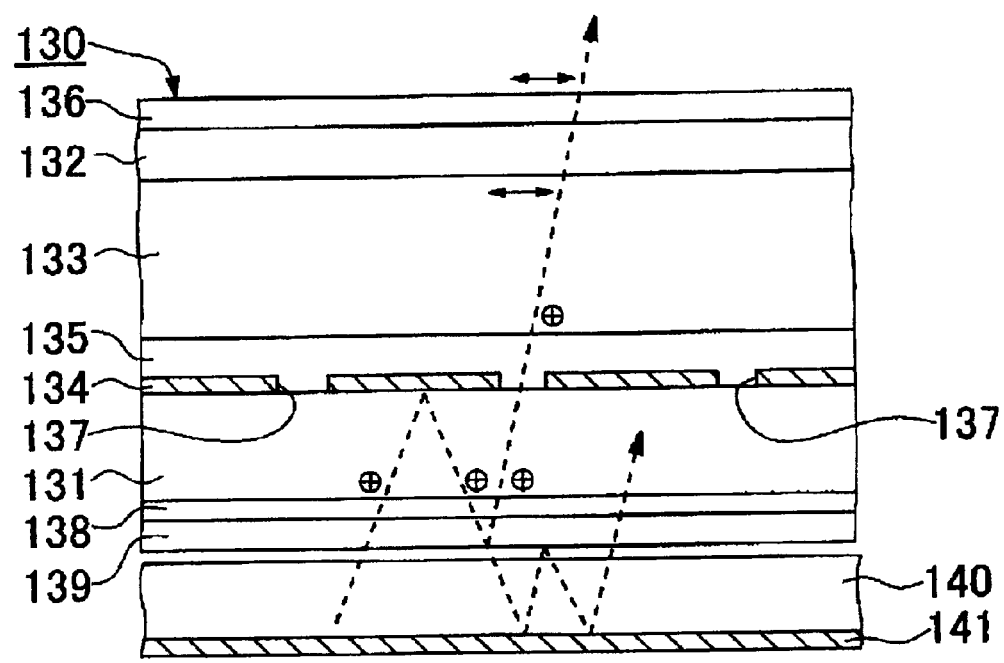
FIG. 8 is a schematic showing the partial sectional structure of a liquid-crystal display device according to the present invention in a schematic manner.

In the fifth embodiment, unless otherwise indicated the general construction of a liquid-crystal display device is the same as in the first embodiment shown in FIG. 1, and detailed description thereof shall therefore be omitted. An aspect in which the liquid-crystal display device of this embodiment differs from that of the first embodiment, is that a transflective film 23 that is made of a thin film of aluminum or the like is disposed instead of a transflective film 6 shown in FIG. 1, and only this aspect will be described with reference to FIG. 5. FIG. 5 is a schematic showing the partial sectional structure of the liquid-crystal display device of this embodiment. In FIG. 5, constituents that are common to FIG. 1 are assigned the same reference numerals.

The transflective film 23 shown in FIG. 5 is the metal thin film which is made of a material of high reflectivity, such as aluminum, and which is uniformly formed on the inner surface of the lower substrate 2, and it is not provided with the slits 10 to transmit light as in the transflective film 6 shown in FIG. 1. This transflective film 23 is formed to be very thin enough to transmit light emitted from the back light 5 in the transmission mode, and the thickness thereof is set at the optimum one or substantially optimum one, depending upon the constituent material of the transflective film 23 and the balance of brightnesses required in the transmission mode and the reflection mode. The reason therefor is that the reflectivity and transmittance of the transflective film 23 are in the relationship of trade-off. That is, when the transflective film 23 is thickened, the reflectivity heightens, but the transmittance lowers, and when it is thinned, the transmittance heightens, but the reflectivity lowers.

(Electronic Apparatus)

Examples of electronic apparatuses which each include the liquid-crystal display device of any of the embodiments will be described.

Figure 9:
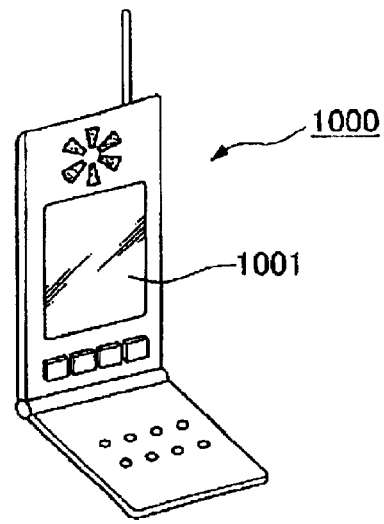
FIG. 9 is a perspective view showing an example of an electronic apparatus according to the present invention.

FIG. 9 is a perspective view showing an example of a mobile telephone. Referring to FIG. 9, numeral 1000 designates a mobile telephone, and numeral 1001 designates a liquid-crystal display unit employing the liquid-crystal display device described above.

Figure 10:
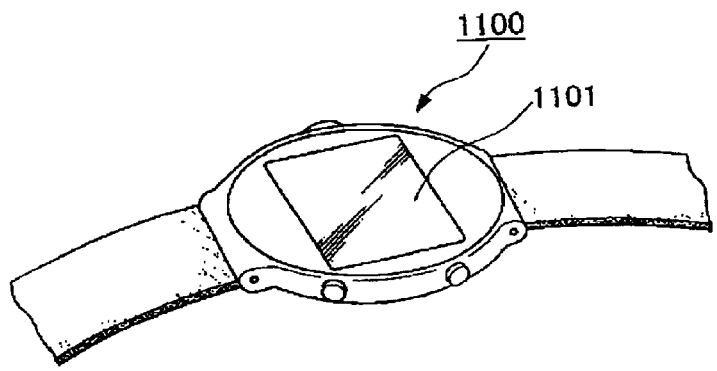
FIG. 10 is a perspective view showing another example of an electronic apparatus according to the present invention.

FIG. 10 is a perspective view showing an example of a wrist watch type electronic apparatus. Referring to FIG. 10, numeral 1100 designates a watch, and numeral 1101 designates a liquid-crystal display unit employing the liquid-crystal display device described above.

Figure 11:
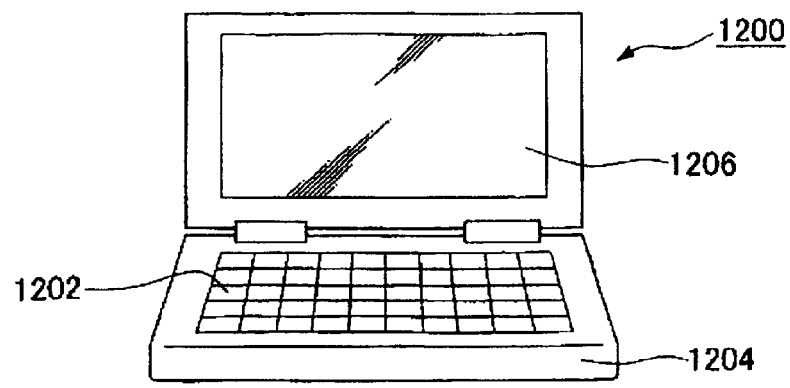
FIG. 11 is a perspective view showing still another example of an electronic apparatus according to the present invention.

FIG. 11 is a perspective view showing an example of a mobile type information processing apparatus, such as word processor and personal computer, for example. Referring to FIG. 1, numeral 1200 designates the information processing apparatus, numeral 1202 an input unit such as keyboard, numeral 1204 an information processing apparatus, and numeral 1206 a liquid-crystal display unit employing the liquid-crystal display device described before.

The electronic apparatus shown in each of FIGS. 9–11 include the liquid-crystal display unit employing the liquid-crystal display device of the foregoing embodiment, so that an electronic apparatus having the display unit which can attain a display of high brightness in a transmission mode can be realized.

EXAMPLES

Although the effects of the present invention will be clarified in conjunction with examples below, the present invention shall not be restricted to the ensuing examples.

Liquid-crystal display devices of constructions shown in FIGS. 1 and 2 were respectively fabricated as Examples 1 and 2.

Each of the liquid-crystal display devices was a transflective type color liquid-crystal display device of passive matrix system in which the number of dots was 160 dots× 120 dots, and the pitch of the dots was 0.24 mm.

In each of the liquid-crystal display devices of Examples 1 and 2, a transflective film 6 was constructed of an aluminum thin film, and it was formed with two openings of 0.068 mm×0.022 mm at every pixel, in such a manner that the openings were diagonally arrayed in the corresponding pixel. A polarization layer 7 was applied "LC Polarizer" produced by Optiva, Inc. in U.S. and was thereafter cured.

Next, a liquid-crystal display device of a prior-art construction shown in FIG. 12 was fabricated as a comparative example. This liquid-crystal display device was also a transflective type color liquid-crystal display device of a passive matrix system having the number of dots of 160 dots×120 dots and the dot pitch of 0.24 mm, as with each of the liquid-crystal display devices of Examples 1 and 2.

Transmittance and reflectivity corresponding to the brightnesses of respective displays in a transmission mode and a reflection mode were measured as to the liquid-crystal display devices of Examples 1 and 2 and the comparative example. Also, respective contrasts in the transmission mode and the reflection mode were measured. The measured results are listed in Table 1 below.

As indicated in Table 1, it has been affirmed that the liquid-crystal display devices of Examples 1 and 2 having the constructions of the present invention have their transmittance enhanced three times or more as compared with the liquid-crystal display device of the comparative example. It has also been affirmed that the contrasts in the transmission mode are sharply enhanced. These enhancements are considered attributed to the fact that each of the liquid-crystal display devices of Examples 1 and 2 can utilize the light of a back light 5 efficiently for the display.

On the other hand, the reflectivity of each of the liquid-crystal display devices of Examples 1 and 2 is 28%, which is somewhat inferior to the reflectivity of the liquid-crystal display device of the comparative example. It has been affirmed, however, that the contrast in the reflection mode is sharply enhanced. The enhancement of the contrast considered attributed to the fact that, although the brightness of the bright display lowers to some extent, the dark display becomes darker.

TABLE 1

|  | Example 1 | Example 2 | Comparative Example |
|---|---|---|---|
| Transmittance | 7% | 7% | 2% |
| Contrast in the Transmission Mode | 16 | 20 | 10 |
| Reflectivity | 28% | 28% | 30% |
| Contrast in the Reflection Mode | 18 | 18 | 10 |

[Advantages of the Invention]

As described above in detail, according to the present invention, a quarter-wave plate and a polarizer on the outer side of a lower substrate heretofore required in a liquid-crystal display device of transflective type can be omitted by adopting a construction in which a polarization layer is stacked on a transflective film. As a result, lowering of the quantity of light attributed to the quarter-wave plate and the polarizer can be reduced, minimized or prevented to realize a liquid-crystal display device of excellent visibility in which the brightness of a display in a transmission mode is remarkably enhanced.

Besides, according to the present invention, an electronic apparatus having a display unit of excellent visibility can be provided by including the liquid-crystal display device capable of the display of high brightness in the display unit.

What is claimed is:

1. A transflective-type liquid crystal display device, comprising:

a first substrate;

a second substrate opposing the first substrate;

liquid crystals disposed between the first substrate and the second substrate;

a reflective film disposed at reflective regions and not at transmissive regions in between the liquid crystals and the second substrate;

an absorption polarization layer disposed to one side of the second substrate in between the liquid crystals and the reflective film, the absorption polarization layer having a transmission axis in a direction;

electrodes disposed between the liquid crystals and the absorption polarization layer;

an absorption polarizer disposed to the opposite side of the second substrate than the absorption polarization layer, the absorption polarizer having a transmission axis substantially parallel to the direction of the transmission axis of the absorption polarization layer; and an illumination device arranged externally of the second substrate with respect to the liquid crystals.

2. The liquid-crystal display device according to claim 1, the absorption polarization layer serving as a flattening film to flatten unevenness.

3. The liquid-crystal display device according to claim 1, a scattering layer that scatters light reflected by the reflective film being disposed over the reflective film or on a surface thereof.

4. The liquid-crystal display device according to claim 1, the reflective film being formed with openings for transmitting light.

5. The liquid-crystal display device according to claim 1, a reflective polarizer which has a transmission axis that is substantially parallel to that of the absorption polarizer being disposed on an outer surface side of the absorption polarizer.

6. The liquid-crystal display device according to claim 1, color filters being disposed on the inner surface side of the first substrate or the inner surface side of the second substrate.

7. The liquid-crystal display device according to claim 6, the absorption polarization layer being disposed on the color filters.

8. An electronic apparatus, comprising:

the liquid-crystal display device according to claim 1.

* * * * *